(12) United States Patent
Shimamoto et al.

(10) Patent No.: US 10,538,616 B2
(45) Date of Patent: Jan. 21, 2020

(54) THERMALLY EXPANDABLE FIRE RESISTANT RESIN COMPOSITION

(71) Applicant: SEKISUI CHEMICAL CO., LTD., Osaka (JP)

(72) Inventors: Michio Shimamoto, Saitama (JP); Hideaki Yano, Saitama (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 76 days.

(21) Appl. No.: 15/505,953

(22) PCT Filed: Aug. 27, 2015

(86) PCT No.: PCT/JP2015/074216
§ 371 (c)(1),
(2) Date: Feb. 23, 2017

(87) PCT Pub. No.: WO2016/031910
PCT Pub. Date: Mar. 3, 2016

(65) Prior Publication Data
US 2017/0253691 A1    Sep. 7, 2017

(30) Foreign Application Priority Data
Aug. 27, 2014    (JP) .................. 2014-173016

(51) Int. Cl.
| | | |
|---|---|---|
| C08J 9/00 | (2006.01) | |
| C08G 59/20 | (2006.01) | |
| C08K 3/04 | (2006.01) | |
| C08G 59/30 | (2006.01) | |
| C08G 59/50 | (2006.01) | |
| C08K 3/22 | (2006.01) | |
| C08K 3/26 | (2006.01) | |
| C08K 3/32 | (2006.01) | |

(52) U.S. Cl.
CPC ........... C08G 59/20 (2013.01); C08G 59/308 (2013.01); C08G 59/504 (2013.01); C08J 9/0066 (2013.01); C08K 3/04 (2013.01); C08K 3/22 (2013.01); C08K 3/26 (2013.01); C08K 2003/265 (2013.01); C08K 2003/323 (2013.01)

(58) Field of Classification Search
CPC .... C08G 59/20; C08G 59/308; C08G 59/504; C08J 9/0066; C08K 3/013; C08K 3/04; C08K 3/22; C08K 3/26; C08K 3/2279; C08K 3/32; C08K 5/098; C08K 2003/265; C08K 2003/323; C08K 2201/016; C08L 23/0853; C08L 23/16; C08L 23/286; C08L 27/06; C08L 27/24; C08L 33/12; C08L 63/00; C08L 101/00; C08L 2205/03
See application file for complete search history.

(56) References Cited

U.S. PATENT DOCUMENTS

| | | | | |
|---|---|---|---|---|
| 7,553,899 B2* | 6/2009 | Mawatari | ............. | C08F 279/02 524/100 |
| 8,722,145 B2* | 5/2014 | Panse | ................ | A41D 31/0027 252/62 |
| 2007/0282027 A1 | 12/2007 | Fujimoto et al. | | |
| 2013/0034709 A1* | 2/2013 | Takahashi | ............... | C08K 3/04 428/213 |
| 2013/0045358 A1 | 2/2013 | Swindells | | |
| 2014/0336321 A1 | 11/2014 | Yamasugi et al. | | |

FOREIGN PATENT DOCUMENTS

| | | |
|---|---|---|
| EP | 0 814 121 | 12/1997 |
| JP | 9-176404 | 7/1997 |
| JP | 9-227747 | 9/1997 |
| JP | 2001-146466 | 5/2001 |
| JP | 2005-2268 | 1/2005 |
| JP | 2006-52566 | 2/2006 |
| JP | 2006-348228 | 12/2006 |
| JP | 2007-326908 | 12/2007 |
| JP | 2009-197115 | 9/2009 |
| JP | 2013-136939 | 7/2013 |
| JP | 5352017 | 11/2013 |
| JP | 2014-25310 | 2/2014 |
| WO | 2013/080563 | 6/2013 |

OTHER PUBLICATIONS

Weblio Jiten (Weblio Dictionary), Oil and Natural Gas Terminological Dictionary, relevant page regarding lognormal distribution, <http://www.weblio.jp/content/%E5%AF%BE%E6%95%B0%E6%AD%A3%E8%A6%8F%E5%88%86%E5%B8%83>, 7 pages, (2017), with English translation.
Sekiyu Yougo Jiten (Oil Terminology Dictionary), "Log-normal distribution", 1st edition, pp. 22-23 and pp. 226-229 (1974), with English Translation.
Yamamoto et al., "Methods and Actual Cases of High Accuracy Particle Size Measurement", Study Report from Miyazaki Prefecture Industrial Technology Center • Food Development Center, 51:13-17 (2006), with English Translation.
International Search Report dated Oct. 13, 2015 in International (PCT) Application No. PCT/JP2015/074216.
Extended European Search Report dated Mar. 12, 2018 in European Patent Application No. 15835504.0.
Decision of Refusal dated Aug. 1, 2017 in corresponding Japanese Application No. 2015-548521, with English translation.
Notification of Reasons for Revocation dated Dec. 4, 2018 for corresponding Japanese Patent No. 6286004 (Opposition No. 2018-700696), with English translation.
Report of measurement of aspect ratio, report No. NT18040100-2 (Demandant's Exhibit No. 3-1), discussed in CA (see English translation of CA).
Report of measurement of aspect ratio, report No. NT18040100-1 (Demandant's Exhibit No. 3-2), discussed in CA (see English translation of CA).
"Inorganic Chemistry", chemie.de, http://www.chemie.de/lexikon/Anorganische_Chemie_html, (2017), with English translation.
Objection by 3rd Parties Pursuant to Article 115 EPC issued Aug. 29, 2018 in European Patent Application No. 15835504.0, with English translation.
Notification of Reasons for Refusal dated Nov. 13, 2018 in corresponding Japanese Patent Application No. 2017-212366, with English translation.

* cited by examiner

Primary Examiner — John M Cooney
(74) Attorney, Agent, or Firm — Wenderoth, Lind & Ponack, L.L.P.

(57) ABSTRACT

This invention relates to a thermally expandable fire-resistant resin composition comprising a resin component in an amount of 100 parts by weight, thermally expandable graphite in an amount of 3 to 300 parts by weight, and an inorganic filler in an amount of 2 to 200 parts by weight, wherein the thermally expandable graphite has an average aspect ratio of 20 or more.

5 Claims, 2 Drawing Sheets

THERMALLY EXPANDABLE FIRE RESISTANT RESIN COMPOSITION

CROSS REFERENCE OF RELATED APPLICATION

This application claims priority to JP2014-173016A, filed on Aug. 27, 2014, the disclosure of which is incorporated herein by reference in its entirety.

TECHNICAL FIELD

The present invention relates to a thermally expandable fire-resistant resin composition.

BACKGROUND ART

Synthetic resins are widely used as building materials because they have good moldability and enable mass production of uniform products. However, since synthetic resins easily melt or burn, generating gas or smoke, materials with a low level of smoke emission and excellent fire resistance have been desired for safety in case of fire. In particular, door or window sashes require a material that is flame-retardant, and that can also retain the shapes of door or window sashes even during fire and prevent fire from reaching outside (back side) the doors or windows.

As a material that meets such a demand, Patent Literature 1 discloses a chlorinated polyvinyl chloride resin composition capable of long-time stable extrusion molding of a profile molded product having a complicated cross-sectional shape such as a sash. The chlorinated polyvinyl chloride resin composition comprises 100 parts by weight of a chlorinated polyvinyl chloride resin, 3 to 300 parts by weight of thermally expandable graphite, 3 to 300 parts by weight of an inorganic filler, and 20 to 200 parts by weight of a plasticizer, and does not contain a phosphorus compound (excluding a phosphate plasticizer).

CITATION LIST

Patent Literature

PTL 1: Japanese Patent No. 53522017

SUMMARY OF INVENTION

Technical Problem

Thermally expandable resin compositions were generally considered to have difficulty in attaining both high expansion and high residue hardness after combustion of the resin compositions, because the residue hardness was remarkably reduced when expansion was high. However, this problem was not discussed in the above literature.

An object of the present invention is to provide a thermally expandable fire-resistant resin composition attaining both high expansion and high residue hardness.

Another object of the present invention is to provide a thermally expandable fire-resistant resin composition attaining high expansion, high residue hardness, and shape retention.

Solution to Problem

To overcome the above problems, the inventors conducted extensive research. As a result, the inventors surprisingly found that high expansion and high residue hardness after combustion can be consequently obtained because the number of graphite pieces in the resin composition increases, increasing its density, when the average aspect ratio of the thermally expandable graphite is high. The present invention has thus been accomplished.

The present invention provides a thermally expandable fire-resistant resin composition described below.

1. A thermally expandable fire-resistant resin composition comprising a resin component in an amount of 100 parts by weight, the/many expandable graphite in an amount of 3 to 300 parts by weight, and an inorganic filler in an amount of 2 to 200 parts by weight, wherein the thermally expandable graphite has an average aspect ratio of 20 or more.
2. The thermally expandable fire-resistant resin composition according to Item 1, wherein the thermally expandable graphite has an average particle diameter within the range of 100 to 1000 μm, and an average thickness of 50 μm or less.
3. The thermally expandable fire-resistant resin composition according to Item 1 or 2, wherein the resin component comprises at least one member selected from the group consisting of polyvinyl chloride, chlorinated vinyl chloride, and thermoplastic elastomers.
4. The thermally expandable fire-resistant resin composition according to any one of Items 1 to 3, comprising no phosphorus compound (excluding a phosphate plasticizer).
5. A fire-resistant member comprising the thermally expandable fire-resistant resin composition according to any one of Items 1 to 4.
6. A fitting comprising the fire-resistant member according to Item 5.

Advantageous Effects of Invention

The thermally expandable fire-resistant resin composition of the present invention has excellent fire resistance because the resulting molded product has high expansion and high residue hardness. The resin composition of the present invention further attains excellent shape retention. In a specific embodiment, the the/many expandable fire-resistant resin composition of the present invention enables long-time stable extrusion molding, in particular, long-time stable extrusion molding of a profile molded product having a complicated cross-sectional shape such as a sash.

DESCRIPTION OF EMBODIMENTS

Figure 1:
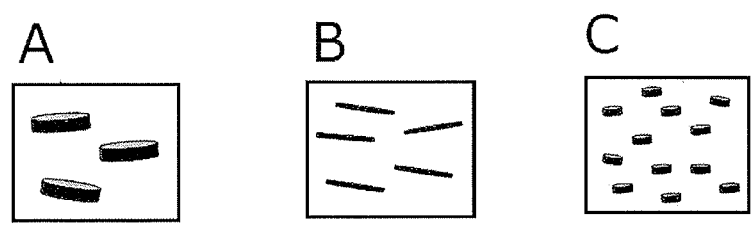
FIG. 1 explains the thermally expandable graphite in the present invention.

As used in the specification, the singular forms ("a," "an," and "the") include the plural unless otherwise specified separately, or unless the context clearly dictates otherwise.

The thermally expandable fire-resistant resin composition of the present invention comprises a resin component in an amount of 100 parts by weight, thermally expandable graphite in an amount of 3 to 300 parts by weight, and an inorganic filler in an amount of 2 to 200 parts by weight, in which the thermally expandable graphite has an average aspect ratio of 20 or more.

Examples of the resin component used in the present invention include synthetic resins such as thermoplastic resins and thermosetting resins, elastomers, rubbers, and combinations thereof.

Examples of the thermoplastic resin include polyolefin resins such as polypropylene resins, polyethylene resins, poly(1-) butene resins, and polypentene resins; polystyrene resins; acrylonitrile-butadiene-styrene (ABS) resins; polycarbonate resins; polyphenylene ether resins; acrylic resins; polyamide resins; polyvinyl chloride resins; polyisobutylene resins; and the like.

Examples of the thermosetting resin include urethane resins, isocyanurate resins, epoxy resins, phenol resins, urea resins, unsaturated polyester resins, alkyd resins, melamine resins, diallyl phthalate resins, silicone resins, and the like.

Examples of the elastomer include thermoplastic elastomers such as olefin elastomers, styrene elastomers, ester elastomers, amide elastomers, and vinyl chloride elastomers.

Examples of the rubber include resins of rubbers such as natural rubber, butyl rubber, fluorine-containing rubber, urethane rubber, silicone rubber, polychloroprene rubber, polybutadiene rubber, polyisoprene rubber, polyisobutylene rubber, styrene-butadiene rubber, butadiene-acrylonitrile rubber, nitrile rubber, rubber of ethylene-$\alpha$ olefin copolymer, e.g., an ethylene-propylene-diene copolymer, and the like.

These synthetic resins and/or rubbers can be used singly, or in a combination of two or more. To adjust the melt viscosity, flexibility, tackiness, etc., of the resin component, two or more resin components can be mixed and used as a base resin.

The resin component may be crosslinked or modified to an extent such that the fire resistance property is not impaired. To perform crosslinking or modification of the resin component, the resin component may be crosslinked or modified in advance, or the resin component may be crosslinked or modified when or after other components such as a phosphorus compound or an inorganic filler described below are incorporated.

The method for crosslinking the resin component is not particularly limited. Examples thereof include crosslinking methods generally employed for the resin component, e.g., crosslinking methods using various crosslinking agents or peroxides, and crosslinking methods using electron beam irradiation.

In one embodiment, the resin component comprises at least one member selected the group consisting of from polyvinyl chloride, chlorinated vinyl chloride, and thermoplastic elastomers. In another embodiment, the resin component comprises at least one member selected from the group consisting of EPDM, polybutene, and polybutadiene.

The chlorinated vinyl chloride resin is a chlorinated product of vinyl chloride resin, and is preferably contained in an amount within the range of 60 to 72% by weight because a decrease in the chlorine content reduces heat resistance, and an increase in the chlorine content makes melt extrusion molding difficult.

The vinyl chloride resin is not particularly limited as long as it is a conventionally known vinyl chloride resin. Examples thereof include a vinyl chloride homopolymer; a copolymer of a vinyl chloride monomer and a monomer having an unsaturated bond copolymerizable with the vinyl chloride monomer; a graft copolymer obtained by graft copolymerization of vinyl chloride with a (co)polymer other than vinyl chloride; and the like. These resins can be used singly, or in a combination of two or more.

The monomer having an unsaturated bond copolymerizable with the vinyl chloride monomer is not particularly limited as long as it is copolymerizable with a vinyl chloride monomer. Examples thereof include $\alpha$-olefins such as ethylene, propylene, and butylene; vinyl esters such as vinyl acetate and vinyl propionate; vinyl ethers such as butyl vinyl ether and cetyl vinyl ether; (meth)acrylic acid esters such as methyl(meth)acrylate, ethyl(meth)acrylate, and butyl acrylate; aromatic vinyls such as styrene and $\alpha$-methylstyrene; N-substituted maleimides such as N-phenyl maleimide and N-cyclohexyl maleimide; and the like. These monomers can be used singly, or in a combination of two or more.

The (co)polymer to be graft copolymerized with the vinyl chloride is not particularly limited as long as it can be graft (co)polymerized with vinyl chloride. Examples thereof include an ethylene-vinyl acetate copolymer, an ethylene-vinyl acetate-carbon monoxide copolymer, an ethylene-ethyl acrylate copolymer, an ethylene-butyl acrylate-carbon monoxide copolymer, an ethylene-methyl methacrylate copolymer, an ethylene-propylene copolymer, an acrylonitrile-butadiene copolymer, polyurethane, chlorinated polyethylene, chlorinated polypropylene, and the like. These (co)polymers can be used singly, or in a combination of two or more.

The average degree of polymerization of the vinyl chloride resin is not particularly limited, and is preferably 600 to 1500 because a decrease in the average degree of polymerization reduces the mechanical physical properties of the molded product, and an increase in the average degree of polymerization increases the melt viscosity, making melt extrusion molding difficult.

EPDM used in the present invention is, for example, a ternary copolymer of ethylene, propylene and a crosslinking diene monomer.

Examples of the crosslinking diene monomer used in EPDM include, but are not particularly limited, cyclic dienes such as 5-ethylidene-2-norbornene, 5-propylidene-5-norbornene, dicyclopentadiene, 5-vinyl-2-norbornene, 5-methylene-2-norbornene, 5-isopropylidene-2-norbornene, and norbornadiene; chain unconjugated dienes such as 1,4-hexadiene, 4-methyl-1,4-hexadiene, 5-methyl-1,4-hexadiene, 5-methyl-1,5-heptadiene, 6-methyl-1,5-heptadiene, and 6-methyl-1,7-octadiene; and the like.

EPDM preferably has a crosslinking diene monomer content of 2.0 to 20% by weight, and more preferably 5.0 to 15% by weight.

A crosslinking diene monomer content of 2.0% by weight or more provides excellent flexibility because of a promoting crosslinking reaction among molecules, and a crosslinking diene monomer content of 20% by weight or less provides excellent weather resistance.

As polybutadiene, commercially available products can be suitably selected and used. Examples thereof include homopolymer-type butadienes such as Kuraprene LBR-305 (produced by Kuraray Co., Ltd.), copolymers of 1,2-bond type butadiene and 1,4-bond type butadiene such as Poly bd (produced by Idemitsu Kosan Co., Ltd.), copolymers of ethylene, 1,4-bond type butadiene, and 1,2-bond type butadiene such as Kuraprene L-SBR-820 (produced by Kuraray Co., Ltd.).

Polybutene preferably has a weight average molecular weight of 300 to 2000, which is measured in accordance with ASTM D 2503. Polybutene having a weight average molecular weight of 300 to 2000 ensures excellent extrusion moldability.

Examples of the polybutene used in the present invention include "100R" and "300R" (weight average molecular weight: 940 and 1450) produced by Idemitsu Sekiyu Kagaku Co., Ltd., "HV-100" (weight average molecular weight: 970) produced by Japan Oil Chemistry Co., Ltd., "H-100" (weight average molecular weight: 940) produced by Amoco Corporation, and the like.

Regarding the resin component used in the present invention, those obtained by adding at least either of polybutene or polybutadiene to EPDM are preferable to improve the moldability.

The amount of the at least either of polybutene or polybutadiene to be added is preferably in the range of 1 to 30 parts by weight, and more preferably 3 to 25 parts by weight relative to 100 parts by weight of resin component.

The thermally expandable graphite is a conventionally known substance that is produced as a graphite intercalation compound by treating a powder of natural flake graphite, thermal decomposition graphite, kish graphite, or the like, with an inorganic acid such as concentrated sulfuric acid, nitric acid, and selenic acid, and a strong oxidant such as concentrated nitric acid, perchloric acid, perchlorate, permanganate, dichromate, and hydrogen peroxide. The thermally expandable graphite is a crystalline compound in which a carbon layer structure is maintained.

As the thermally expandable graphite, thermally expandable graphite obtained by acid treatment may be neutralized with ammonia, lower aliphatic amine, an alkali metal compound, an alkaline earth metal compound, or the like.

Examples of the lower aliphatic amine include monomethyl amine, dimethyl amine, trimethyl amine, ethyl amine, propyl amine, butyl amine, and the like. Examples of the alkali metal compound and the alkaline earth metal compound include a hydroxide, an oxide, a carbonate, a sulfate, an organic acid salt, etc., of potassium, sodium, calcium, barium, magnesium, etc. Specific examples of the thermally expandable graphite may include "CA-60S" produced by Nippon Kasei Chemical Co., Ltd., and the like.

The thermally expandable graphite used in the present invention has an average aspect ratio of 20 or more, and preferably 25 or more. When the aspect ratio of the thermally expandable graphite is too high, cracking may occur; accordingly, the aspect ratio is preferably 1000 or less. The thermally expandable graphite having an average aspect ratio of 20 or more contributes to high expansion of the resin composition and high residue hardness after combustion.

The average aspect ratio is the proportion of the average diameter in the horizontal direction to the thickness in the perpendicular direction. The thermally expandable graphite used in the present invention has a substantially plate shape; accordingly, the perpendicular direction can be considered to correspond to the thickness direction, and the horizontal direction can be considered to correspond to the diameter direction. Accordingly, the value obtained by dividing the maximum size in the horizontal direction by the thickness in the perpendicular direction is regarded as the aspect ratio.

The aspect ratios of a sufficiently large number of graphite pieces, i.e., the aspect ratio of at least ten graphite pieces, are measured, and the average value thereof is regarded as the average aspect ratio. The average particle diameter of the thermally expandable graphite can also be obtained as the average value of the maximum size in the horizontal direction.

The maximum size of the thermally expandable graphite in the horizontal direction and the thickness of the flake graphite can be measured using, for example, a field emission scanning electron microscope (FE-SEM).

In one embodiment, the thermally expandable graphite has an average particle diameter within the range of 1 to 100 µm, and an average thickness of 50 µm or less.

The reason the fire resistance of the thermally expandable fire-resistant resin composition is improved by setting the average aspect ratio of the thermally expandable graphite to 20 or more is not entirely clarified. According to FIG. 1, FIG. 1(A) shows conventionally known thermally expandable graphite and FIG. 1(B) shows the thermally expandable graphite of the present invention. Compared to the conventionally known thermally expandable graphite of FIG. 1(A), the thermally expandable graphite of FIG. 1(B) can be present in a large number in the same space, and the expansion efficiency of the composition is large when the aspect ratio is high. However, when the thermally expandable graphite having an overly small aspect ratio is provided as in FIG. 1(C), although it can be present in a large number in the same space, the expansion efficiency of the composition is confirmed to be small (data not shown). Accordingly, it is a surprising finding that the thermally expandable graphite of FIG. 1(B) contributes to improvement in fire resistance.

When the amount of the thermally expandable graphite to be added is small, fire resistance performance and foamability are reduced; while when it is large, extrusion molding becomes difficult and the surface property of the resulting molded product is deteriorated, which reduces mechanical physical properties. Accordingly, the amount of the thermally expandable graphite to be added is 3 to 300 parts by weight relative to 100 parts by weight of the resin component.

The amount of the thermally expandable graphite to be added is preferably within the range of 10 to 200 parts by weight relative to 100 parts by weight of the resin component.

The inorganic filler is not particularly limited as long as it is an inorganic filler generally used for producing vinyl chloride resin molded products. Examples thereof include silica, diatomite, alumina, zinc oxide, titanium oxide, calcium oxide, magnesium oxide, iron oxide, tin oxide, antimony oxide, ferrite, calcium hydroxide, magnesium hydroxide, aluminum hydroxide, basic magnesium carbonate, calcium carbonate, magnesium carbonate, zinc carbonate, barium carbonate, dawsonite, hydrotalcite, calcium sulfate, barium sulfate, gypsum fibers, calcium silicate, talc, clay, mica, montmorillonite, bentonite, activated clay, sepiolite, imogolite, sericite, glass fibers, glass beads, silica balloons, aluminum nitride, boron nitride, silicon nitride, carbon black, graphite, carbon fibers, carbon balloons, charcoal powder, various metal powders, potassium titanate, magnesium sulfate, lead zirconia titanate, aluminum borate, molybdenum sulfide, silicon carbide, stainless fibers, zinc borate, various magnetic powders, slag fibers, fly ash, dewatered sludge, and the like. Calcium carbonate and hydrous inorganic compounds such as calcium hydroxide, magnesium hydroxide, and aluminum hydroxide, which are dehydrated during heating and have an endothermic effect, are preferable. Further, antimony oxide is preferable since it has an effect of improving flame retardancy. These inorganic fillers can be used singly, or in a combination of two or more.

When the amount of the inorganic filler to be added is small, the fire resistance performance is reduced; while when it is large, extrusion molding becomes difficult and the surface property of the resulting molded product is deteriorated, which reduces mechanical physical properties.

Accordingly, the amount of the inorganic filler to be added is 3 to 200 parts by weight relative to 100 parts by weight of the resin component.

The amount of the inorganic filler to be added is preferably within the range of 10 to 150 parts by weight relative to 100 parts by weight of the resin component.

As described above, the thermally expandable fire-resistant resin composition of the present invention contains a resin component, thermally expandable graphite, and an inorganic filler; however, when a phosphorus compound (excluding a phosphate plasticizer) is contained, the extrusion moldability is reduced. Therefore, a phosphorus compound (excluding phosphate plasticizer) is preferably not contained. A phosphate plasticizer, which is a plasticizer described below, can be contained.

A phosphorus compound inhibiting extrusion moldability is as follows.

Red phosphorus; various phosphates such as triphenyl phosphate, tricresyl phosphate, trixylenyl phosphate, cresyl diphenylphosphate, and xylenyl diphenylphosphate; metal salts of phosphoric acids such as sodium phosphate, potassium phosphate, and magnesium phosphate; ammonium polyphosphates; compounds represented by formula (1) below; and the like.

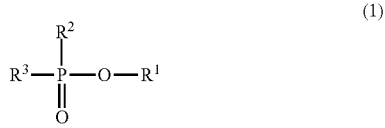

(1)

In the formula, $R^1$ and $R^3$ represent hydrogen, a linear or branched alkyl group having 1 to 16 carbon atoms, or an aryl group having 6 to 16 carbon atoms. $R^2$ represents a hydroxyl group, a linear or branched alkyl group having 1 to 16 carbon atoms, a linear or branched alkoxyl group having 1 to 16 carbon atoms, an aryl group having 6 to 16 carbon atoms, or an aryloxy group having 6 to 16 carbon atoms.

Examples of the compound represented by formula (1) include methylphosphonic acid, dimethyl methylphosphate, diethyl methylphosphate, ethylphosphonic acid, propylphosphonic acid, butylphosphonic acid, 2-methylpropylphosphonic acid, t-butylphosphonic acid, 2,3-dimethyl-butylphosphonic acid, octylphosphonic acid, phenylphosphonic acid, dioctylphenylphosphonate, dimethylphosphinic acid, methylethylphosphinic acid, methylpropylphosphinic acid, diethylphosphinic acid, dioctylphosphinic acid, phenylphosphinic acid, diethylphenylphosphinic acid, diphenylphosphinic acid, bis(4-methoxyphenyl)phosphinic acid, and the like.

Examples of the ammonium polyphosphate include, but are not particularly limited to, ammonium polyphosphate, melamine-modified ammonium polyphosphate, and the like.

In the present invention, these phosphorus compounds inhibiting extrusion moldability are not used.

The resin composition of the present invention may further comprise a plasticizer. In one embodiment, when a vinyl chloride resin is used as a resin component, the resin composition of the present invention comprises a plasticizer.

The plasticizer is not particularly limited as long as it can be generally used for the production of vinyl chloride resin molded products. Examples thereof include phthalate plasticizers such as di-2-ethylhexyl phthalate (DOP), dibutyl phthalate (DBP), diheptyl phthalate (DHP), and diisodecyl phthalate (DIDP); fatty acid ester plasticizers such as di-2-ethylhexyl adipate (DOA), diisobutyl adipate (DIBA), and dibutyl adipate (DBA); epoxidized ester plasticizers such as epoxidized soy bean oil; polyester plasticizers such as adipic acid ester and adipic acid polyester; trimellitate plasticizers such as tri-2-ethylhexyl trimellitate (TOTM) and triisononyl trimellitate (TINTM); and phosphate plasticizers such as trimethyl phosphate (TMP) and triethyl phosphate (TEP). These plasticizers can be used singly, or in a combination of two or more.

When the amount of the plasticizer to be added is small, the extrusion moldability is reduced; while when it is large, the resulting molded product becomes too soft. Accordingly, the amount of the plasticizer to be added is 20 to 200 parts by weight relative to 100 parts by weight of the resin component.

The thermally expandable fire-resistant resin composition of the present invention may optionally include, within a range not impairing its physical properties, a heat stabilizer, a lubricant, a process aid, a thermally decomposing foaming agent, an antioxidant, an antistatic agent, a pigment, and the like, which are generally used during thermal molding of a vinyl chloride resin composition, other than a phosphorus compound.

Examples of the heat stabilizer include lead heat stabilizers such as tribasic lead sulfate, tribasic lead sulfite, dibasic lead phosphite, lead stearate, and dibasic lead stearate; organic tin heat stabilizers such as organic tin mercapto, organic tin malate, organic tin laurate, and dibutyl tin malate; metal soap heat stabilizers such as zinc stearate and calcium stearate; and the like. These heat stabilizers can be used singly, or in a combination of two or more.

Examples of the lubricant include waxes such as polyethylene, paraffin, and montanic acid; various ester waxes; organic acids such as stearic acid and ricinoleic acid; organic alcohols such as stearyl alcohol; amido compounds such as dimethyl bisamide; and the like. These lubricants can be used singly, or in a combination of two or more.

Examples of the process aid include chlorinated polyethylene, methyl methacrylate-ethyl acrylate copolymer, high-molecular-weight poly(methyl methacrylate), and the like.

Examples of the thermally decomposing foaming agent include azodicarbonamide (ADCA), dinitrosopentamethylenetetramine (DPT), p,p-oxybis(benzenesulfonyl hydrazide) (OBSH), azobisisobutyronitrile (AIBN), and the like.

The thermally expandable fire-resistant resin composition of the present invention can produce a long molded product by melt extrusion at 130 to 170° C. using an extruder such as a single-screw extruder or a twin-screw extruder, in accordance with a conventional method. The thermally expandable fire-resistant resin composition of the present invention is used for imparting fire resistance to fittings such as windows, shoji [paper sliding doors], doors, sliding doors, fusuma [Japanese sliding screens], and ramma [transoms]; ships; elevator structures; and the like. In particular, since the thermally expandable fire-resistant resin composition of the present invention has excellent moldability, a long-profile molded product having a complicated cross-sectional shape can be easily obtained.

Figure 2:
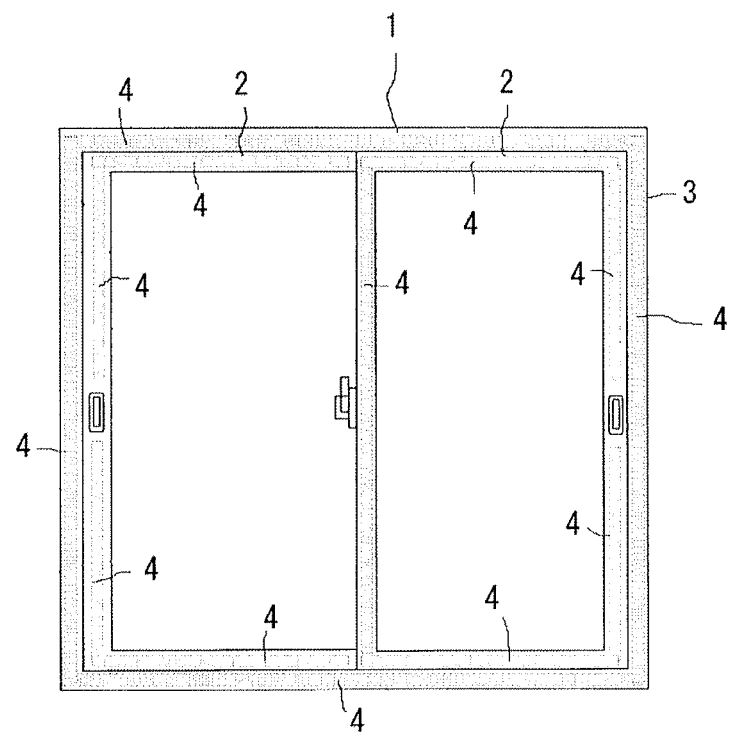
FIG. 2 is a schematic elevation view showing a fire-resistant window in which the molded products of the resin composition of the present invention are provided in a sash frame.

Accordingly, the present invention includes a fire-resistant member such as a molded product comprising the resin composition of the present invention, and a fitting comprising the fire-resistant member. For example, FIG. 2 is a schematic view showing the sash frame of window 1, which is a fitting, in which molded products 4 formed of the resin composition of the present invention are provided. In this example, the sash frame comprises two inner frames 2 and one outer frame 3 surrounding two inner frames 2, and molded products 4 are provided inside inner frames 2 and outer frame 3 along each side of inner frames 2 and outer frame 3. By providing molded products 4 in this manner, fire resistance can be imparted to window 1.

In one embodiment, the expansion rate after heating the thermally expandable fire-resistant resin composition of the present invention at 600° C. for 30 minutes and the residue hardness exceed 10 and 0.24 kgf/cm², respectively. Since the thermally expandable graphite has an average aspect ratio of 20 or more, and the thermally expandable fire-resistant resin composition has the above-mentioned expansion rate and residue hardness, it has excellent shape retention.

EXAMPLES

With reference to the figures, the present invention is explained in detail by Examples. The present invention is not limited to these Examples.

Examples 1 and 2, and Comparative Example 1

Aspect Ratio

As thermally expandable graphite, "ADT501" produced by ADT Co., Limited, "EXP50T" produced by Nippon Graphite Industries Co., Ltd., and "GREP-EG" (expansion starting temperature: 220° C.) produced by Tosoh Corporation were respectively used in Examples 1 and 2, and Comparative Example 1. Each thermally expandable graphite having an aspect ratio shown in Table 1 was added in an amount shown in Table 1.

Measurement of Expansion Rate and Residue Hardness

Moldability

In all of Examples 1 and 2, and Comparative Example 1, a long-profile molded product having a fine surface was obtained by 2-hour extrusion molding. After 2-hour extrusion molding, the mixture was not attached to the screw and mold, attaining excellent moldability.

Expansion Rate

A specimen (length: 100 mm, width: 100 mm, thickness: 2.0 mm) prepared from the resulting molded product was placed in an electric furnace, and heated at 600° C. for 30 minutes. The thickness of the specimen was measured, and (the thickness of the specimen after heating)/(the thickness of the specimen before heating) was calculated as the expansion rate.

Residue Hardness

The heated specimen after the measurement of expansion rate was placed in a compression tester ("Finger-Feeling Tester" produced by Kato Tech Co., Ltd.), and compressed with an indenter of 0.25 cm² at a speed of 0.1 cm/s to measure the stress at a break point.

Residue Shape Retention

The residue hardness is an indicator of the hardness of the residue after expansion. However, the measurement is performed only on the front surface part of the residue; therefore, it may not be an indicator of the hardness of the entire residue. Accordingly, the residue shape retention was measured as an indicator of the hardness of the entire residue. For the residue shape retention, both ends of the specimen after the measurement of expansion rate were lifted by hand, and the brittleness of the residue during lifting was measured visually. A case where the specimen was lifted without collapsing was evaluated as PASS, and a case where the specimen was collapsed and not lifted was evaluated as FAIL.

Figure 3:
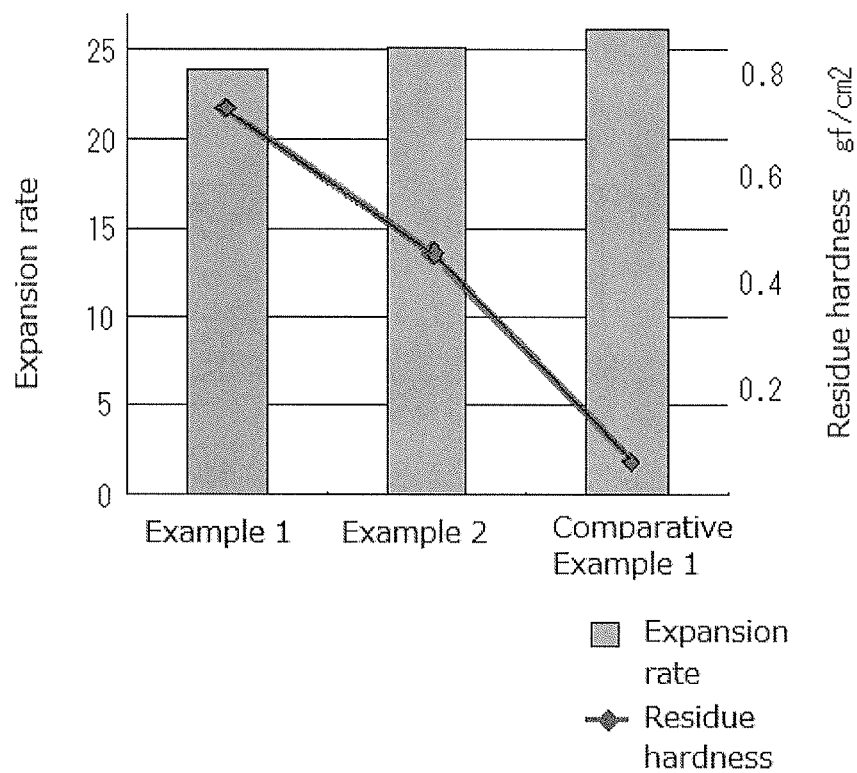
FIG. 3 is a graph showing the expansion rate and residue hardness of each sample.

The measurement results of the expansion rate, residue hardness, and residue shape retention of the resulting molded product are as shown in Table 1 and FIG. 3. In Examples 1 and 2, relatively high expansion rate and high residue hardness were maintained; however, in Comparative Example 1, the residue hardness was reduced and the residue shape retention was also poor.

TABLE 1

|  |  |  | Example 1 | Example 2 | Comparative Example 1 |
|---|---|---|---|---|---|
| Mixture | CPVC |  | 100 | 100 | 100 |
|  | Thermally expandable graphite | ADT501 | 100 |  |  |
|  |  | EXP50T |  | 100 |  |
|  |  | GREP-EG |  |  | 100 |
|  | Calcium carbonate |  | 27 | 27 | 27 |
|  | Antimony trioxide |  | 10 | 10 | 10 |
|  | DIDP |  | 97 | 97 | 97 |
|  | Ca—Zn composite stabilizer |  | 3 | 3 | 3 |
|  | Calcium stearate |  | 4.5 | 4.5 | 4.5 |
|  | Chlorinated polyethylene |  | 10 | 10 | 10 |
|  | Polymethyl methacrylate |  | 20 | 20 | 20 |
| Aspect ratio |  |  | 25.2 | 30.6 | 18.2 |
| Expansion rate |  |  | 23.88 | 25.12 | 26.13 |
| Residue hardness |  |  | 0.74 | 0.45 | 0.08 |
| Residue shape retention |  |  | PASS | PASS | FAIL |

Examples 3 to 22

Each of the mixtures containing components shown in Table 2 was introduced into a single-screw extruder in the same manner as described in Examples 1 and 2, and Comparative Example 1, and a long-profile molded product having an E cross-sectional shape was obtained by 2-hour extrusion molding at 150° C. at a speed of 1 m/hr.

The thermally expandable graphite "ADT351" produced by ADT Co., Limited had an aspect ratio of 21.3.

Epoxy resins obtained in the following manner were used. As a resin component, CPVC in Examples 3 to 6, a polyvinyl chloride resin (polymerization degree of 1000, referred to as "PVC") in Examples 7 to 10, an ethylene-vinyl acetate copolymer resin (Evaflex EV360 produced by Mitsui du Pont Chemical Co., Ltd., referred to as "EVA") in Examples 11 to 15, ethylene-propylene-diene rubber (Mitsui EPT 3092M produced by Mitsui Chemicals Inc., referred to as "EPDM") in Examples 16 to 20, and a bisphenol F epoxy monomer ("E807" produced by Yuka Shell K.K. ( ) in Examples 21 and 22 were used; and each resin component and a diamine curing agent ("EKFL052" produced by Yuka Shell K.K.) were mixed in a ratio of 3:2 together with other raw materials, followed by heat-curing, thereby obtaining the epoxy resins.

"AP422" produced by Clariant and "Diana Process Oil PW-90" produced by Idemitsu Kosan Co., Ltd. were used as ammonium polyphosphate and a softener, respectively.

Moldability

In all of Examples 3 to 22, a long-profile molded product having a fine surface was obtained by 2-hour extrusion molding. After 2-hour extrusion molding, the mixture was not attached to the screw and mold, attaining excellent moldability.

Expansion Rate

A specimen (length: 100 mm, width: 100 mm, thickness: 2.0 mm) prepared from the resulting molded product was placed in an electric furnace, and heated at 600° C. for 30 minutes. The thickness of the specimen was measured, and (the thickness of the specimen after heating)/(the thickness of the specimen before heating) was calculated as the expansion rate.

Residue Hardness

The heated specimen after the measurement of expansion rate was placed in a compression tester ("Finger-Feeling Tester" produced by Kato Tech Co., Ltd.), and compressed with an indenter of 0.25 cm² at a speed of 0.1 cm/s to measure the stress at a break point.

All of the molded products of Examples 3 to 22 maintained a relatively high expansion rate and high residue hardness, as in Examples 1 and 2 (data not shown).

Residue Shape Retention

The residue hardness is an indicator of the hardness of the residue after expansion. However, the measurement is performed only on the front surface part of the residue; therefore, it may not be an indicator of the hardness of the entire residue. Accordingly, the residue shape retention was measured as an indicator of the hardness of the entire residue. For the residue shape retention, both ends of the heated specimen after the measurement of expansion rate were lifted by hand, and the brittleness of the residue during lifting was measured visually. A case where the specimen was lifted without collapsing was evaluated as PASS, and a case where the specimen was collapsed and not lifted was evaluated as FAIL.

TABLE 2

| Mixture | | | Example 3 | Example 4 | Example 5 | Example 6 |
|---|---|---|---|---|---|---|
| | CPVC | | 100 | 100 | 100 | 100 |
| | Thermally expandable graphite | ADT501 | 150 | | 150 | |
| | | ADT351 | | 150 | | 150 |
| | Ammonium polyphosphate | | 0 | 100 | 0 | 0 |
| | Calcium carbonate | | 5 | 100 | 5 | 5 |
| | Antimony trioxide | | 5 | 0 | 0 | 0 |
| | DIDP | | 100 | 100 | 100 | 100 |
| | Chlorinated polyethylene | | 10 | 10 | 10 | 10 |
| | Polymethyl methacrylate | | 20 | 20 | 20 | 20 |
| Residue shape retention | | | PASS | PASS | PASS | PASS |

| | | | Example 7 | Example 8 | Example 9 | Example 10 |
|---|---|---|---|---|---|---|
| Mixture | PVC | | 100 | 100 | 100 | 100 |
| | Thermally expandable graphite | ADT501 | 100 | | 150 | 150 |
| | | ADT351 | | 100 | | |
| | Ammonium polyphosphate | | 50 | 50 | 25 | 0 |
| | Melamine polyphosphate | | 0 | 0 | 0 | 25 |
| | Calcium carbonate | | 50 | 50 | 25 | 25 |
| | DIDP | | 100 | 100 | 100 | 100 |
| | Chlorinated polyethylene | | 10 | 10 | 10 | 10 |
| | Polymethyl methacrylate | | 20 | 20 | 20 | 20 |
| Residue shape retention | | | PASS | PASS | PASS | PASS |

| | | | Example 11 | Example 12 | Example 13 | Example 14 | Example 15 |
|---|---|---|---|---|---|---|---|
| Mixture | EVA | | 100 | 100 | 100 | 100 | 100 |
| | Thermally expandable graphite | ADT501 | 100 | | 150 | 150 | |
| | | ADT351 | | 100 | | | 150 |
| | Ammonium polyphosphate | | 50 | 50 | 25 | 0 | 0 |
| | Calcium carbonate | | 50 | 50 | 25 | 25 | 25 |
| Residue shape retention | | | PASS | PASS | PASS | PASS | PASS |

| | | | Example 16 | Example 17 | Example 18 | Example 19 | Example 20 |
|---|---|---|---|---|---|---|---|
| Mixture | EPDM | | 100 | 100 | 100 | 100 | 100 |
| | Thermally expandable graphite | ADT501 | 100 | | | | |
| | | ADT351 | | 100 | | | 150 |
| | | GREP-EG | | | 100 | 150 | |
| | Softener | | 30 | 30 | 30 | 30 | 30 |
| | Ammonium polyphosphate | | 50 | 50 | 50 | 0 | 0 |
| | Calcium carbonate | | 50 | 50 | 50 | 30 | 30 |
| Residue shape retention | | | PASS | PASS | PASS | PASS | PASS |

| | | | Example 21 | Example 22 |
|---|---|---|---|---|
| Mixture | Epoxy | | 100 | 100 |
| | Thermally expandable graphite | ADT501 | 100 | |
| | | ADT351 | | 100 |
| | Ammonium polyphosphate | | 100 | 100 |
| | Calcium carbonate | | 100 | 100 |
| Residue shape retention | | | PASS | PASS |

The invention claimed is:

1. A thermally expandable fire-resistant resin composition comprising a resin component in an amount of 100 parts by weight, thermally expandable graphite in an amount of 3 to 300 parts by weight, and an inorganic filler in an amount of 2 to 200 parts by weight, wherein:
   the resin component comprises:
   at least one member selected from the group consisting of a polyvinyl chloride, a chlorinated vinyl chloride, an olefin elastomer, an ester elastomer, and an amide elastomer; or
   at least one member selected from the group consisting of an ethylene-propylene-diene rubber, a polybutene, and a polybutadiene; or
   an ethylene-vinyl acetate copolymer; or
   an epoxy resin, and
   wherein the thermally expandable graphite has an average aspect ratio of 20 or more, an average particle diameter within the range of 100 to 1000 µm, and an average thickness of 50 µm or less.

2. The thermally expandable fire-resistant resin composition according to claim 1, comprising no phosphorus compound, wherein the phosphorus compound excludes a phosphate plasticizer.

3. A fire-resistant member comprising the thermally expandable fire-resistant resin composition according to claim 1.

4. A fitting comprising the fire-resistant member according to claim 3.

5. The thermally expandable fire-resistant resin composition according to claim 1, wherein the resin component comprises at least one member selected from the group consisting of a polyvinyl chloride, a chlorinated vinyl chloride, an olefin elastomer, an ester elastomer, and an amide elastomer.

* * * * *